UNITED STATES PATENT OFFICE.

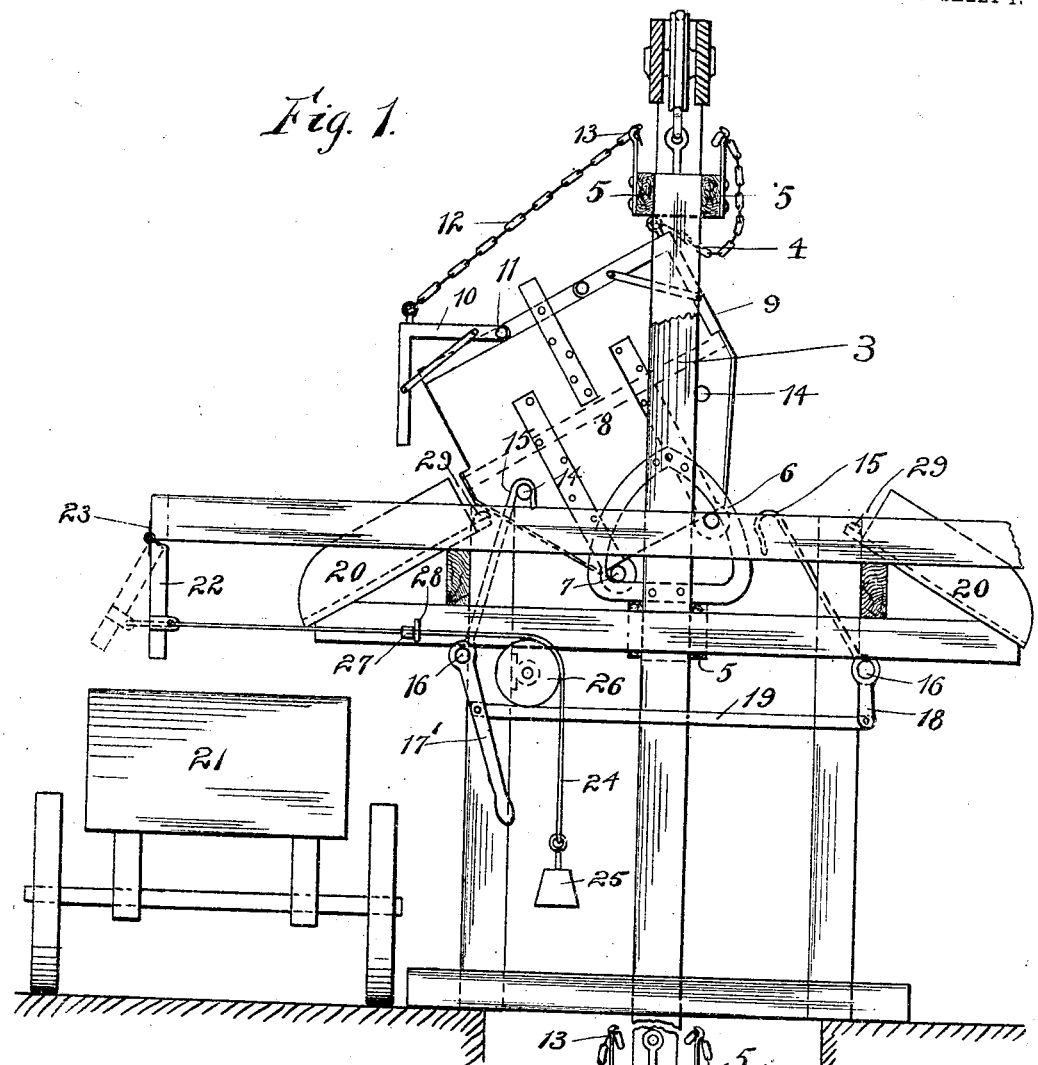

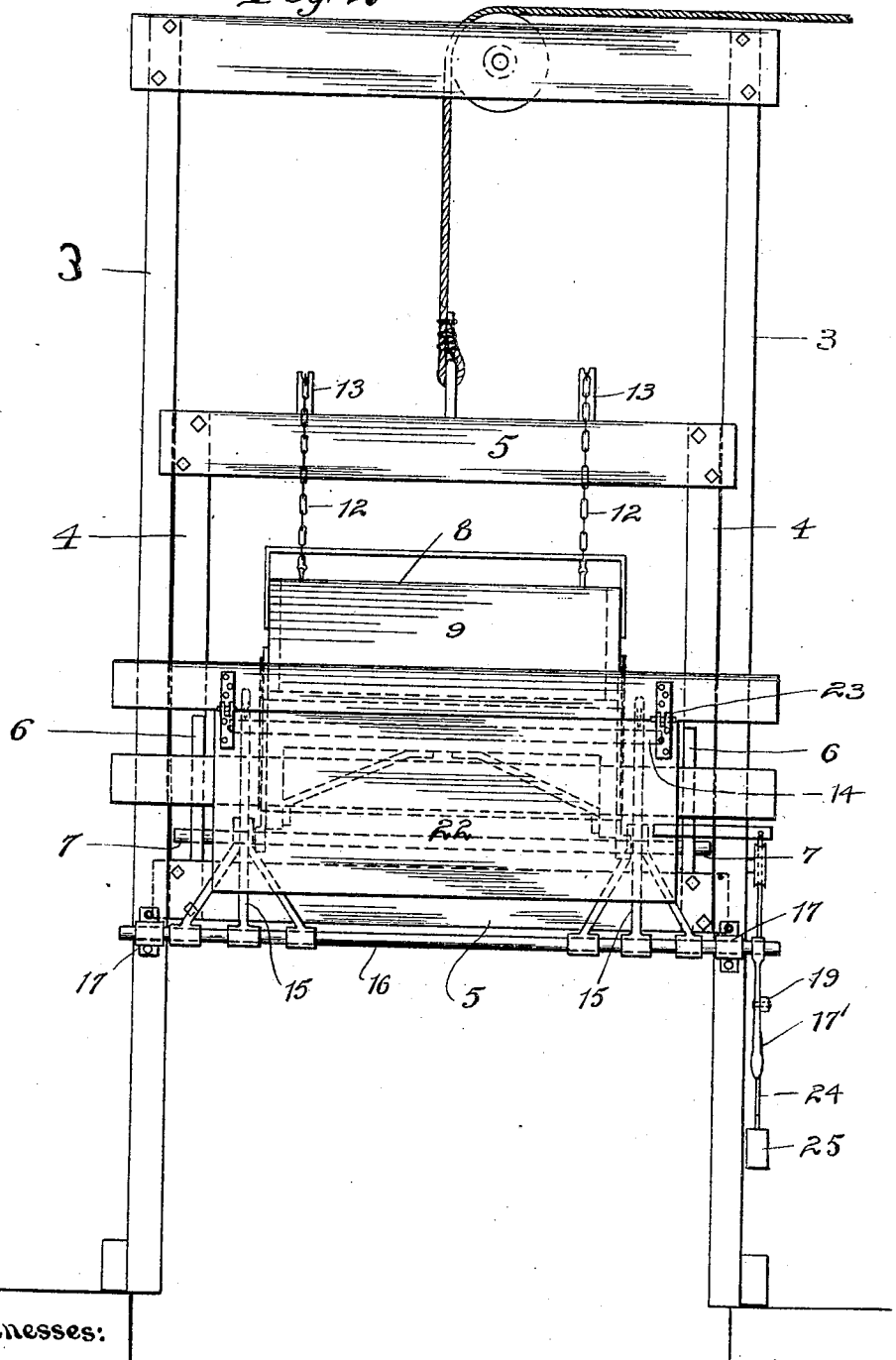

WILLIAM J. NEWMAN, OF CHICAGO, ILLINOIS.

AUTOMATIC-DUMPING ELEVATOR-CAGE.

No. 809,456.     Specification of Letters Patent.     Patented Jan. 9, 1906.

Application filed August 18, 1904. Serial No. 221,176.

*To all whom it may concern:*

Be it known that I, WILLIAM J. NEWMAN, a citizen of the United States, and a resident of Chicago, in the county of Cook and State of Illinois, have invented certain new and useful Improvements in Automatic-Dumping Elevator-Cages, of which the following is a specification.

This invention relates to an elevator-cage which is adapted to be filled at the bottom of the shaft and which will be automatically dumped at either side of the shaft when it reaches a predetermined position at the top.

It is more particularly designed to be used in excavating-work, and is so arranged that wheelbarrows or the like may be dumped directly into the elevator-cage or hoppers, said hopper being tipped and a door opened for discharging the same when the cage arrives at the top of the shaft.

This invention comprises the combination of a suitable elevator-guideway, a framework adapted to be raised and lowered in said guideway, a cage or hopper carried by said framework and adapted to be tipped sidewise in either direction for dumping, means for dumping said cage or hopper, suitable chutes and operating mechanism and such other devices and details of construction as will appear hereinafter.

This invention is illustrated in the accompanying drawings, in which—

Figure 1 is an end elevation of an apparatus embodying this invention, one elevator-cage being shown at the bottom of the shaft and the other cage being shown in a dumping position at the top thereof. Fig. 2 is a side elevation of the apparatus of Fig. 1, shown above the surface of the ground, the cage being in an upright position just before dumping.

As shown in the drawings, 3 represents a suitable guideway or framework in an elevator-shaft, the same being of any ordinary or preferred form of construction. The elevator proper comprises upright side posts 4, which are connected at the top and bottom by cross-pieces 5, which engage with the guides 3 to hold the elevator-frame in vertical position. Two heart-shaped brackets 6 6 are rigidly secured to the side posts 4 at or near the bottom thereof. These brackets support two cross rods or shafts 7, which carry the dumping-hopper 8. This hopper is made in the form of a rectangular box with side doors 9, the bottom of said box being at some distance above the shafts 7 and the ends of said box being extended downward to form a rigid construction. The doors 9 are pivoted on arms 10 to the ends of the box at 11, so that they may swing up freely to allow the discharge of the material, which is frequently in large lumps or chunks. The doors are connected, by means of chains 12, to hooks 13 on the upper cross-pieces 5, these chains being of sufficient length to allow the doors to close when the hopper is in normal position and to open the doors when the hopper is tipped. The support of the hopper 8 on the shafts 7 is such that the weight of the hopper, whether empty or loaded, will always maintain the same in normal upright position; but the car may be tipped to either side, one of the shafts 7 then acting as a pivot while the other shaft acts as a guide, being held by the opposite side of the heart-shaped bearing.

In order to dump the hopper, I have provided two cross-rods 14, which are secured in the ends and pass below the bottom thereof. As the hopper approaches the dumping-point one of these rods is engaged by two hooks 15, a pair of these hooks being arranged on shaft 16 on each side of the frame, having their bearings 17 secured to posts of the main stationary framework. In order that only one pair of these hooks will be in position to engage with one of the shafts 14 and in order to dump the hopper in either direction as desired, one of the shafts is provided with a lever 17', which is rigidly secured thereto, and the other shaft with an arm 18, which is connected to the lever 17' by means of a pivoted rod 19. By throwing the lever 17' in either direction, as desired, one pair of hooks will be brought into position for engagement with the corresponding rod 14, while the other pair will be thrown out of engaging position. When the rod 14 engages with the hooks, a further upward movement of the elevator-cage causes the hopper to be swung on one of the bearing-rods 7 and will thereby be tipped to dumping position, as shown at the top of Fig. 1. At the same time the chain 12 will open the door 9, and allow the material to be discharged onto one of the chutes 20, which are arranged at either side of the elevator.

The material passing down the chutes is delivered into wagons 21; but occasionally the velocity of the material is such that the lumps will be discharged over the outer side of the wagon-box. This is of course most apt to occur when the box is nearly full. In order to prevent such spilling, I have provided a swinging board or stop 22, which is pivoted at 23 to cross-beams of the elevator-frame. This board or stop is held in normal position by means of a rope 24 and weight 25, said rope passing over a pulley 26 on the main frame. A clip 27 on the rope 24 is adapted to engage with a stop 28 on the main frame to prevent the board 22 from being swung too far inward. This yielding support for the board 22 will allow the material to be evenly piled up on the wagon and at the same time will prevent the material from being spilled over the outer side. At the same time the board will stop the material without undue jar to the apparatus, as would occur if it were held rigidly. The spill-board 22 also serves to prevent the material from striking the wagons with too great force, as would occur if it were allowed to discharge freely into the wagons. The wagons are thereby prevented from becoming racked or strained by the material being loaded into them. This is of considerable importance where the material consists of clay or other heavy substance, which is frequently met in excavating.

It will be noted that one or more of these elevators may be operated from the hoisting-engine run by one man, and on account of the automatic operation very economical results will be obtained.

The operation will be readily understood from Fig. 1. The material is dumped directly into the hopper at the bottom of the shaft, and as soon as the hopper is filled it is drawn up to the position shown at the top of Fig. 1. The hooks 15 being engaged with rods 14 draw the hopper to a dumping position. The amount of inclination of the bottom of the hopper is regulated by the height to which the elevator is raised. If the hopper is turned to give a steep inclination of the bottom for dumping, the center of gravity of the hopper will fall without the shaft 7 on which it is being swung. The outer edge of the depending ends of the hopper will then strike against the inner edge of the discharge-chute, which will then support the hopper until it has again swung back to such a position that the center of gravity will fall within the bearing-shafts 7. The inner edges of the chutes are preferably provided with iron guard-strips 29 to prevent their becoming worn by the contact with the hopper. It will be noted that when these edges engage said strips the rod 14 will be substantially above said strips, and any binding action will be prevented.

It is readily apparent that other means for engaging the hopper to cause it to dump will readily suggest themselves as coming within the scope of this invention, and the details of construction may be changed without departing from the spirit thereof. Therefore I do not wish to limit myself to the exact apparatus as herein shown and described; but

What I claim, and desire to secure by Letters Patent, is—

1. The combination of an elevator-frame, heart-shaped supports secured to said frame, a dumping-hopper or box mounted on shafts having their ends carried in said supports, the arrangement being such that said hopper will normally rest in upright position, but may be swung to dump at either side.

2. In an automatic-dumping elevator, the combination of a slidable cage-frame, substantially heart-shaped bearings in said frame, a hopper resting on two shafts having their ends in engagement with said bearings, and adapted to be supported thereby, the bottom of said hopper being at some distance above said shafts, springing doors for said hopper, catches on said hopper, and means for engaging said catches when the elevator is being raised in order to automatically dump the same.

3. The combination with an elevator-cage or the like, of a dumping-platform, two pairs of trunnions or the like for supporting said platform, bearings in said cage for said trunnions, the arrangement being such that the platform may be tipped in either direction, said bearings forming guides for one pair of said trunnions when the other pair are acting as pivots.

4. The combination with an automatic-dumping elevator adapted to dump on either side and provided with dumping-rods, of pairs of hooks mounted on either side of the main frame, and means whereby either of said pairs of hooks may be thrown into position for engaging its corresponding rod, the opposite pair of hooks being simultaneously thrown out of position for engagement.

5. The combination of oppositely-disposed dumping-hooks for an elevator, shafts on which said hooks are mounted, a lever on one of said shafts, and means connecting between said lever and the other shaft whereby a movement of the lever will cause the corresponding movement of both shafts.

6. In a dumping-elevator, the combination of a slidable cage, bearings in said cage, a dumping-platform supported at some distance above said bearings, a pair of shafts having their ends resting in said bearings for supporting said platform, the arrangement being such that the platform may be tipped in either direction, one of said shafts acting as a pivot while the other shaft is guided in said bearings to control the dumping action.

7. In a dumping-elevator, the combination of a slidable cage, bearings in said cage, a pair of shafts having their ends resting in said bearings, a dumping-hopper mounted on said shafts and adapted to swing in either direction upon one of said shafts, one shaft acting as a pivot and the other as a guide, swinging doors for said hopper and means connecting between said doors and said cage whereby one of the doors will be opened when the hopper is swung toward its corresponding side, and means for dumping said hopper.

8. In an apparatus of the character set forth, the combination with a discharge-chute for heavy materials adapted to discharge into wagons, of a swinging spill-board, and means for holding said spill-board in normal position in front of the chute, whereby the material will strike said board to prevent undue striking against the wagons.

9. In an apparatus of the character set forth, the combination with a discharge-chute adapted to discharge into wagons or the like, of a pivoted spill-board and a weight for yieldingly holding said spill-board in normal position to receive the force of material discharged through said chute.

WILLIAM J. NEWMAN.

Witnesses:
RAYMOND C. KOTZ,
M. C. SIKTBERG.